April 19, 1966     M. BITZER     3,246,358
WINDSHIELD CLEANER
Filed June 14, 1962     4 Sheets-Sheet 1
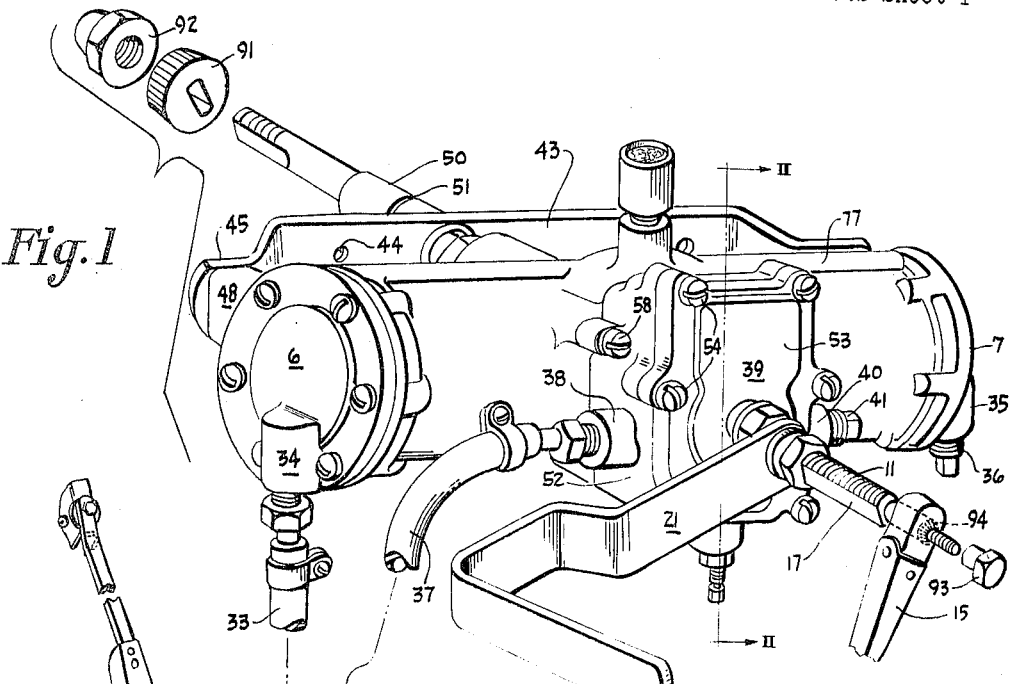
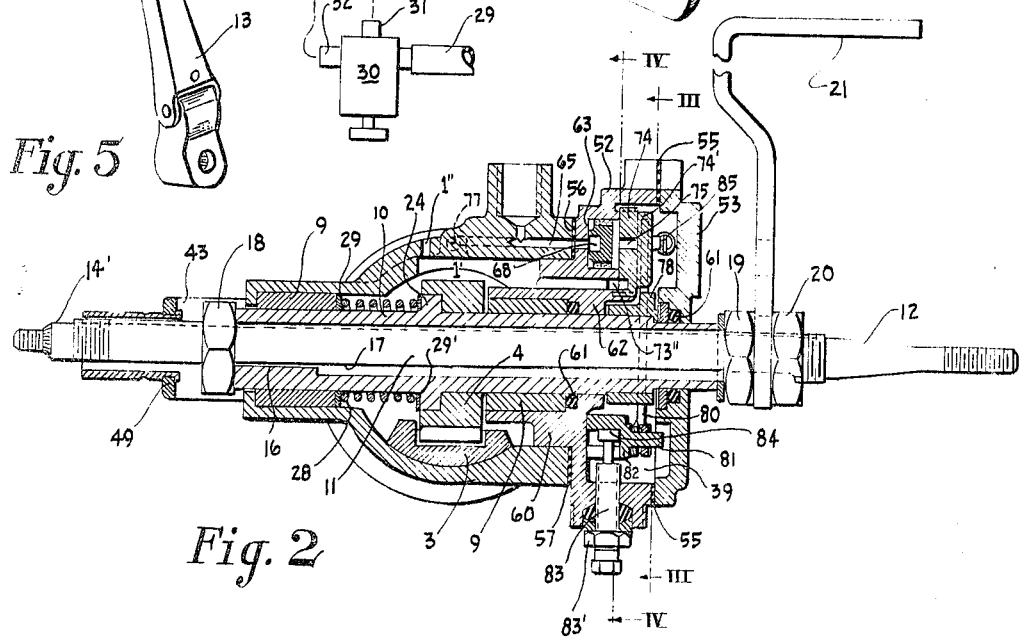
INVENTOR.
MARTIN BITZER
BY E. Herbert Liss
ATTORNEY

INVENTOR.
MARTIN BITZER

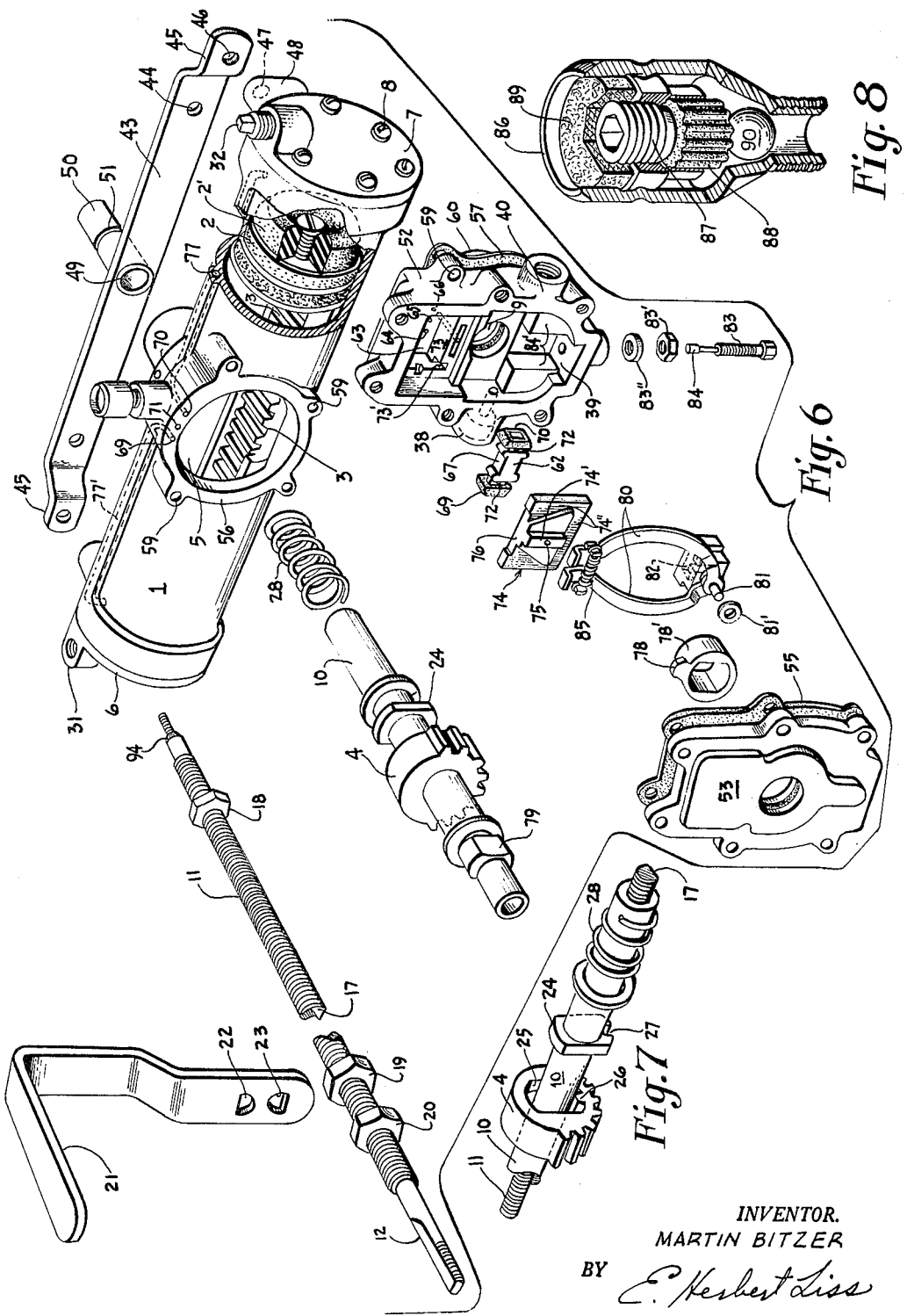

INVENTOR.
MARTIN BITZER
BY E. Herbert Liss
ATTORNEY

United States Patent Office 3,246,358
Patented Apr. 19, 1966

3,246,358
WINDSHIELD CLEANER
Martin Bitzer, Kenmore, N.Y., assignor to Trico
Products Corporation, Buffalo, N.Y.
Filed June 14, 1962, Ser. No. 202,497
6 Claims. (Cl. 15—250.13)

This invention relates to a power actuated windshield cleaner, and more particularly, to one having a flexibility of mounting and adjustment which will adapt it to use on a variety of diverse types of vehicles, including military vehicles and vehicles of the type wherein the windshield is capable of being folded forwardly over the engine hood.

There are certain users of vehicles who operate a fleet which includes a variety of types of vehicles. For example, military vehicles are in this category. It is the practice for such users to stock replacements parts. This is particularly true for military use where under certain military conditions it is essential that the parts be located at the site where the vehicles are stored. Such a variety of vehicles have different requirements for windshield cleaner power units. Heretofore it has been necessary to stock many different types of power units, each usable with a different type of vehicle. It would be desirable to have available at these installations one windshield power cleaner unit which as adaptable for use on a variety of vehicles. This would result in a more accurate stock of replacement parts and would eliminate much waste due to obsolescence and inaccurate stocking of parts.

Some of the differences in windshield cleaners required for different vehicles are different shaft extension lengths, different parking positions, different lengths of stroke and different speeds. For heavy duty applications, larger diameter shafts are required than for lighter duty applications.

Therefore, the principal object of the present invention is to provide an improved windshield cleaner which is universal in application and can be readily adapted to installation on any one of a variety of types of vehicles.

A further object of the invention is to provide an improved windshield cleaner wherein the stroke of the wiper may be regulated from without the wiper motor and adjusted as to wiper arc placement as well as to vary the number of wiper oscillations and the wiper speed per stroke while maintaining a constant motor speed. It is a further object of the invention to provide a fluid pressure actuated windshield cleaner which will permit the wiper to be manually disconnected and parked below the hinged line of the windshield glass in a manner to avoid obstruction to windshield folding or opening movement and, upon manual restoration of the windshield to its closed or upright position, to have the wiper automatically reconnected to the source of power. It is a still further object of the invention to provide an improved windshield cleaner mechanism by which a plurality of usable shaft diameters and lengths are available for adaptation to a plurality of arm sizes.

Other objects and advantages of the invention will be apparent from the following detailed description taken in connection with the accompanying drawings in which:

FIG. 1 is a perspective view of the improved windshield cleaner with portions being exploded for clarity;

FIG. 2 is a transverse vertical sectional view thereof about on line II—II of FIG. 1;

FIG. 5 is a perspective view of the heavy duty wiper arm after removal from the far end of the wiper shaft as depicted in FIG. 1;

FIG. 6 is a more fully exploded perspective view of the wiper motor, showing in clearer detail the fabrication of the motor and its valving action;

FIG. 7 is a partially exploded view of the interlock between the wiper shaft and the power shaft;

FIG. 8 is a detail perspective view of the wiper speed regulator, portions being broken away for clarity;

Figure 9:
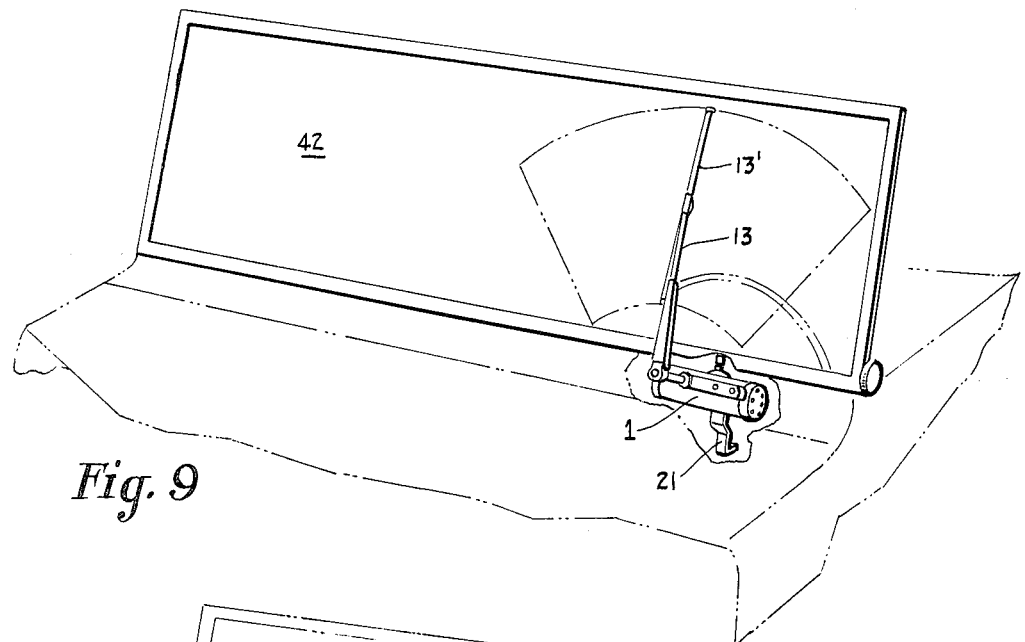
Figure 10:
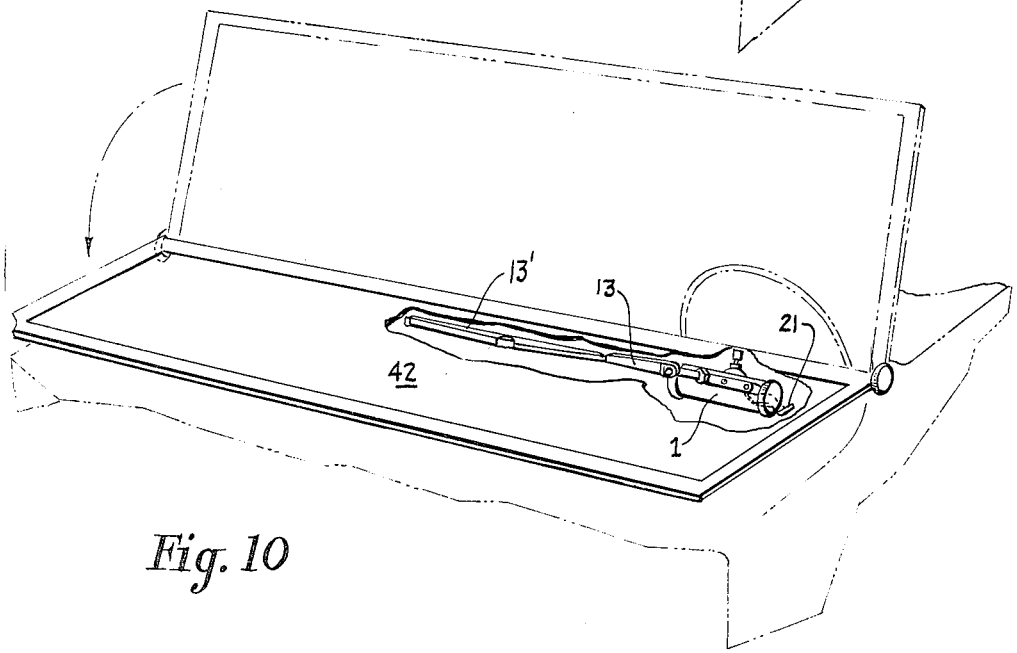

FIG. 9 is a fragmentary perspective view of the invention showing its practical application to a military vehicle of the jeep type, and with the wiper arm in its upright or operative position; and FIG. 10 is a similar view but with the wiper arm in its angularly displaced position and the windshield in its opened or inoperative position wherein the windshield lies folded downwardly over the engine hood.

Referring more particularly to the drawing, the power unit of the windshield cleaner comprises a primary motor 1 and a double headed piston 2 joined in one piece by an intermediate rack 3 that meshes with a segmental pinion 4. Each head may be faced with a resilient bumper 2' for quiet operation. The opposite ends of the piston chamber 5 are closed by removable heads 6 and 7 held in place by suitable fasteners 8. The motor chamber has transversely arranged journal bearings 9 supporting a tubular power shaft 10 and within this hollow shaft is arranged a wiper shaft 11 that projects at its opposite ends for wiper mounting, one end 12 being adapted for mounting a heavy duty wiper carrying arm 13 and the other end 14 for mounting a lighter weight wiper arm 15. The two shafts 10, 11 are slidably interlocked by means of cooperating flat faces 16, 17 that permit relative axial adjustment. The shafts may be fixedly related by threading the units 18 and 19 on wiper shaft 11 to abut the opposite ends of the power shaft 10. A third nut 20 is threaded onto the wiper shaft for cooperating with nut 19 to secure a handle 21 to the shaft, the handle having plural shaft receiving openings 22, 23 to selectively receive the shaft and to position it to advantage, by extending to one side or the other side of the wiper shaft, according to its location on a vehicle, as shown in FIGS. 1 and 6.

The flat faces 16 and 17 serve to key the telescoped shafts to rotate as a unit and this unit derives its power from the pinion 4 in the following manner. The power shaft has a shoulder 24 of irregular periphery that fits a conforming recess 25 in one side face of the pinion 4, the irregularity in contour being enhanced by an inner tooth 26 being received within a notch 27. A spring 28 effects interengagement of the parts when true registry occurs. Washers 29 and 29' support the opposite ends of the spring on the adjacent journal bearing 9 and the shoulder 24. Inward pressure on the handle 21, axially of the wiper shaft, will disengage the clutch parts 24, 25, 26 and 27 of the two shafts 10, 11 and permit manual oscillation of the wiper for hand wiping the windshield as well as to position the wiper below the hinge line of the windshield panel. Upon the release of the hand pressure on the handle 21, the spring 28 will expand to reclutch the two shafts automatically when the motor is again started, since at that time the rack 3 will rock the pinion 4 to bring its recess 25 and its tooth 26 into registry with the mating parts 24, 27 that are fixed on the power shaft.

As previously mentioned, the windshield cleaner is powered by compressed air from a supply line 29 under the control of a valve 30, which latter has a running port 31 and a parking port 32 which are connectible selectively to the motor. The parking port 32 is joined by a hose 33 to a threaded connection 34 on the motor head 6, the unused connection 35 on head 7 being sealed by a closure plug 36. The running port 31 is connected by a hose 37 to a threaded connection 38 leading into the automatic valve chamber 39 at one side. A second threaded connection 40 opens into the opposite side of valve chamber 39 but when not in use it may be closed by a threaded plug 41. The heads 6 and 7 are removable and interchangeable so that their threaded connections 34 and 35 may open upwardly, as in FIG. 6, or downwardly, as in FIG. 1, merely by rotating the heads 180° accordingly. This affords greater flexibility in placing the windshield cleaner on a jeep vehicle, the lower panel 42 of which folds forwardly and downwardly over the engine hood. The control valve 30 may be of the type shown in United States Patent No. 2,857,611, granted October 28, 1956 to John R. Oishei and Martin Bitzer, which provides for the venting of the pressure line at the wiper after parking the wiper.

Any other suitable control valve similar to the aforementioned control valve may also be used. Particularly suitable for heavy equipment where the compressor is used for other controls and provides a pressure source in excess of the pressure required to operate the cleaner would be a control valve which includes a pressure reducing or a pressure regulating means to limit the pressure supplied to the windshield cleaner.

The wiper motor may be securely fastened to the vehicle by a bracket 43 with suitable anchoring fasteners passing through apertures 44 therein. The ends 45 of the bracket are offset and pierced at 46 to receive anchoring screws (not shown) to engage in openings 47 in the mounting pads 48 formed on the ends of the motor casting. Medially the bracket is formed with a shaft-receiving opening 49 in which is fixed a protecting sleeve 50 suitably marked off at intervals by peripheral grooves 51 to enable unused portions of the sleeve to be broken off beyond the required length.

The automatic valve chamber 39 comprises a body section 52 and a cover section 53, these two components being secured together by screws 54 with a sealing gasket 55 in between. The body section 52 is designed to engage an annular seat 56 forming a rim about a side opening into a medial transmission chamber 1' of the motor casting, a sealing gasket 57 being interposed, and the body section 52 is secured to the motor casting by screws 18 that threadedly engage in holes 59. The body section also has a hub part 60 that protrudes rearwardly through the annular seat 56 into the motor chamber where it affords support for the inner journal bearing 9 (FIG. 2). O-rings 61 seal the automatic valve chamber at its opposite sides, against an internal close-fitting flange 62 within the hub 60 at one side, and within the cover section 53 at the opposite side.

Figure 4:
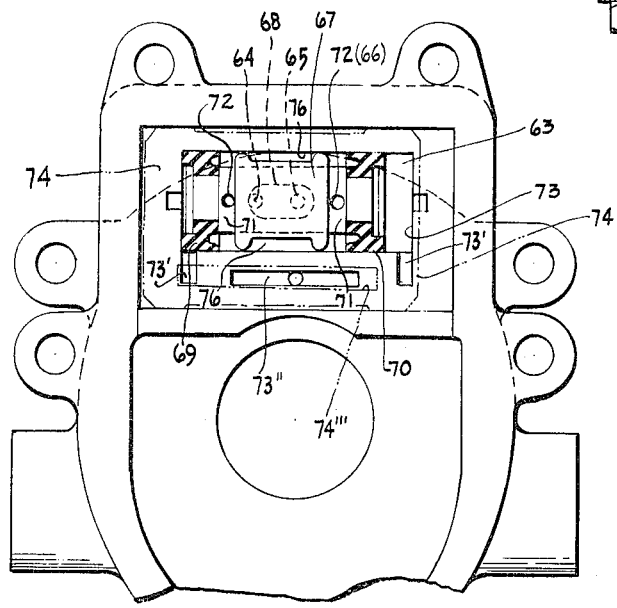

With the valve 30 turned on, the automatic valve chamber 39 becomes a pressurized chamber. Its body section 52 is provided with a depressed valve seat 63 having three ports, namely, two motor ports 64 and 66, that open into the opposite ends of motor chamber 5, and an interposed exhaust port 65, and on this seat reciprocates a motor or pressure actuated valve 67 having a facial passage 68 that alternately connects the exhaust port 65 to the end ports 64 and 66 for wiper motor operation. This motor operated valve 67 carries a pair of pressure responsive pistons 69 and 70, each being connected to the valve body by a supporting neck 71 having a pressure-distributing aperture 72. The valve 67 together with its pistons 69 and 70 slidably fit within a rectangular wall 73 about the depressed seat 63 as a working chamber, and this upstanding wall provides a marginal seat for a valving plate 74 that is automatically shifted back and forth thereon in sealing contact with its pistons 69, 70, the plate being provided with an aperture 75 to admit pressure from the chamber 39 to the pressure energized valve 67 for operatively applying pressure to the wiper motor. The path of the energizing air flow is through clearances 76, apertures 72, the uncovered one of ports 64, 66 (the port 66 underlying in registry with port 72 in FIG. 4), and finally through the connected one of the longitudinal ducts 77, 77' to the adjacent end of the motor chamber 5 so as to drive the piston 2 on its next wiper-imparting stroke to oscillate the pinion 4 and the connected wiper.

The exhaust flow from the opposite ends of the motor chamber 5 is through the longitudinal ducts 77 (77') and out through facial passage 68 and exhaust port 65. The exhaust from the opposite ends of the working chamber 73 is via lateral ducts 73' and an intervening longitudinal duct 73''. The lateral ducts 73' are alternately connectible to the longitudinal duct 73'' by a bridging duct 74''' in the underface of the valve plate from which extends a discharge passage into the central transmission compartment 1' and from thence to the atmosphere through a breather opening 1''.

The shifting of the valve plate 74 is accomplished mechanically by a lug 78 on the power shaft 10. It may be provided with a mounting ring 78' that fits a flat portion 79 of the power shaft 10. The lug 78 is positioned to rock within and against a valve-shifting frame comprising a pair of levers 80 pivotally connected at one end by a supporting pin 81 fixed on an adjustable mount 82. A screw 83 is threaded through the bottom wall of the chamber 39 and swiveled at 84 to the mount 82. Turning the screw will adjust the mount between the guides 84' and vary the effective length of the levers 80 on the valve plate 74. Should the screw be turned clockwise, the mount will elevate the levers relative to the path of the rocking lug 78 and cause the plate to shift earlier. A counterclockwise turning of the screw will delay the shift and cause a longer wiper stroke.

Figure 3:
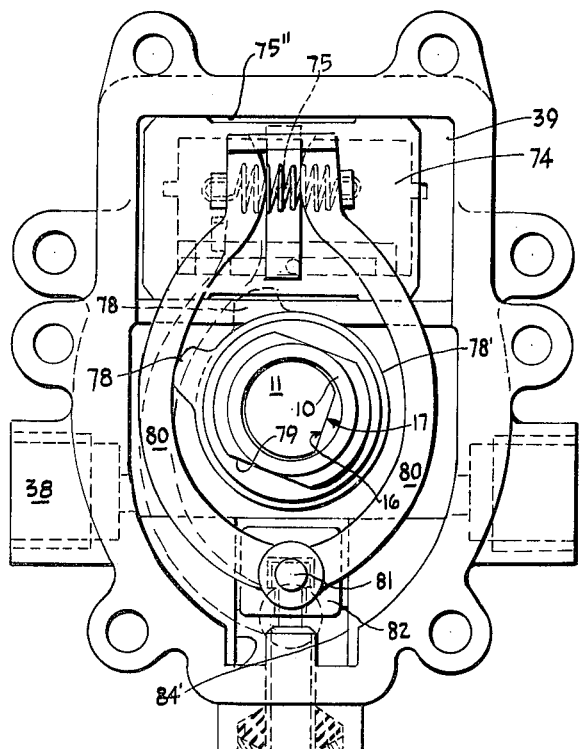
FIGS. 3 and 4 are transverse vertical sectional views about on lines III—III and IV—IV, respectively, of FIG. 2.

The free ends of the levers 80 are joined by a spring 85 and shaped to freely and slidably engage the upright rib 74' on plate 74 and in which the aperture 75 is formed. Thus, the spring frame 80, 85, will slide upwardly along the rib when the screw 83 is rotated clockwise and will slide downwardly on the rib when the screw is reversed. The valving plate may also be relieved in its back at 74'' to provide further clearance for easing the airflow through the pressurized chamber and on to the primary motor 1. When the mount 82 is adjusted vertically to lower the resilient frame 80 with respect to the rocking lug 78 as with a counterclockwise rotation of the screw 83, it will become apparent that the rocking lug 78 will also engage the levers 80 closer to the spring 85, as indicated by the broken lines in FIG. 3, and this results in a longer lever arm 80, an earlier valving action, a shortened wiper stroke, and an accelerated tempo. Upon a raising of the resilient frame 80 with respect to the rocking lug 78, as with a clockwise rotation of screw 83, the wiper strokes will increase in length and reduce in number at a slower tempo. This variation in stroking and speed will be accomplished while maintaining a given setting of the control valve 30.

The timing of the wiper stroke may also be modified and regulated by the use of a muffler 86 which is designed to retard the exhaust flow through the exhaust port 65. By adjusting the screw 87 the rubber body 88 as well as the felt or fiber body 89 may be compressed and made denser. Further, the ball valve 90 may be brought closer to its seat to restrict air flow.

When the cover section 53 is mounted on the pressurized chamber 39, the adjacent end of the power shaft 10 will find journal support in the adjacent bearing 9 as shown in FIG. 2, and the parts are then held in assembled relation by the screws 54.

In use, a knurled head 91 may be fitted on the heavy duty end of the wiper shaft and, after mounting the wiper 13', a nut 92 is threaded on the shaft to secure the heavy duty wiper arm 13 in position thereon. Or, if desired, a lightweight arm 15 may be secured to the opposite end of the wiper shaft by a nut 93 which serves to clamp a wiper arm to the beveled portion 94 of the shaft.

When the windshield cleaner is found to obstruct the opening movement of the windshield, the wiper and arm may be readily displaced by moving the shaft axially outward by hand pressure on the handle 21 which results in the breaking of the interlock 24, 25, 26, 27 and finally swinging the wiper arm to a position below the hinge line of the windshield where the wiper may be parked manually.

When it becomes necessary to again use the windshield during inclement weather, the displaced windshield is brought back to its normal operating position so that the shafts 10 and 11 will automatically couple by and during the starting of the wiper motor through the functioning of the spring 28.

The present windshield cleaner provides a pressure type system in which there is associated with the primary wiper motor 1 a pressurized chamber from which the primary motor is supplied with pressure fluid through a secondary automatic motor for energizing the primary valve action. The adjustable fulcrum of the secondary action is manually adjusted to influence the primary motor to accomplish a unique wiping action without disturbing the primary setting. When the windshield cleaner is first set in operation, the control valve 30 is initially set for pressurizing the chamber 39, and through the intermediary of the secondary valving action, a modified wiper action is impressed upon the primary action to produce a variation in the arcuate travel of the wiper as well as a change of wiper travel. By reason of the spring insert 85 in the resilient frame 80, 85, the frame is designed to yield as the lug 78 wipes against one or the other, or both, of the two levers 80 during oscillation of the resilient frame. Thereby, one action is successfully imposed upon the other action to obtain a combined action in a single wiping stroke. Furthermore, the carrier frame 80 is shiftable as a unit, the same being mounted on the pivot pin 81 so that by turning the screw 83, the effective lengthening or shortening of the lever action with respect to the rocking lug 78 causes a variation in the lug action upon the pivoting carrier frame while the adjusting screw 83 remains fixed in its setting as determined by the lock nut 83'.

The foregoing description has been given in detail for clearness and without thought of limitation since the inventive principles are capable of assuming other physical embodiments without departing from the spirit of the invention and the scope of the appended claims.

What is claimed is:

1. A windshield cleaner comprising a wiper, a fluid motor connected to the wiper for oscillating the same, a primary automatic valve mechanism responsive to the pressure fluid and acting to so move the wiper back and forth, and a secondary valve action responsive to the wiper movement and connected thereto through an adjustable leverage to variably impress itself upon the primary valve for modifying the back and forth movement of the wiper, and means by which the leverage may be manually adjusted to regulate the modification in infinite increments.

2. A windshield cleaner comprising a wiper, a fluid motor operatively connected by shaft means to the wiper, automatic value means operatively applying pressure fluid to the motor to actuate the wiper and including a ported seat with a motorized valve thereon responsive to the pressurized fluid, a power actuated valve operable by the shaft means to operatively apply pressure fluid to the motorized valve, and manually adjustable means for varying the operation of said power actuated valve and therethrough to impose a variation in the pressure operaion of the motorized valve.

3. A windshield cleaner comprising a wiper, motor means operatively connected by shaft means to the wiper, said motor including main and auxiliary fittings for connecting control means thereto, said shaft means including shaft extensions at opposite sides of said motor means for receiving said wiper, each of said shaft extensions having means for securing a selected size wiper thereto, said auxiliary fittings for connecting said control means being operatively symmetrical whereby said motor means may be operatively secured to a vehicle with the wiper mounted on a selected one of said shaft extensions.

4. A universal windshield cleaner for use on diverse forms of motor vehicles including vehicles equipped with folding windshields, relatively large windshields and relatively small windshields, comprising of wiper, motor means operatively connected by shaft means to the wiper, said shaft means including a power shaft and a wiper shaft connected to said power shaft for movement therewith, a clutch operatively connecting the shaft means to the motor means and enabling the shaft means to be declutched from the motor means for manual displacement of the wiper from an associated windshield, said power shaft including means for connecting to said wiper shaft in a plurality of different positions for movement therewith, said shaft means including shaft extensions at opposite sides of said motor means for securing a selected size wiper thereto.

5. A universal windshield cleaner for use on diverse forms of motor vehicles including vehicles equipped with folding windshields, relatively large windshields and relatively small windshields, comprising a wiper, motor means operatively connected by shaft means to the wiper, said shaft means including a power shaft and a wiper shaft connected to said power shaft for movement therewith, a clutch operatively connecting the shaft means to the motor means and enabling the shaft means to be declutched from the motor means for manual displacement of the wiper from an associated windshield, said power shaft including means for connecting to said wiper shaft in a plurality of different positions for movement therewith, said shaft means including shaft extensions at opposite sides of said motor means for securing a selected size wiper thereto, said motor means including main and auxiliary fittings for connecting control means thereto, said auxiliary fittings being operatively symmetrical whereby said motor means may be operatively secured to a vehicle with the wiper mounted on a selected one of said shaft extensions.

6. A universal windshield cleaner for use on diverse forms of motor vehicles including vehicles equipped with folding windshields, relatively large windshields and relatively small windshields, comprising a wiper, motor means operatively connected by shaft means to the wiper, said shaft means including a power shaft and a wiper shaft connected to said power shaft for movement therewith, a clutch operatively connecting the shaft means to the motor means and enabling the shaft means to be declutched from the motor means for manual displacement of the wiper from an associated windshield, said power shaft including means for connecting to said wiper shaft in a plurality of different positions, said shaft means including shaft extensions at opposite sides of said motor means for securing a selected size wiper thereto, said motor means including main and auxiliary fittings for connecting control means thereto, said auxiliary fittings being operatively symmetrical, said motor means including a pressurized chamber with associated automatic valve mechanism to operatively admit fluid pressure to the motor and including a valve shifting lever having an adjustable fulcrum, and manual means for adjusting the fulcrum to regulate the action of the lever and the stroke of the wiper, whereby said wipers may operate with the wiper secured to either shaft extension, the stroke of said wiper may be adjusted and the wiper shaft may be disengaged from the power shaft to permit use on a vehicle with a folding windshield.

References Cited by the Examiner
UNITED STATES PATENTS

| | | | |
|---|---|---|---|
| 1,472,644 | 10/1923 | Folberth et al. | 15—250.34 |
| 1,570,598 | 1/1926 | Folberth et al. | 15—250.34 |
| 1,610,361 | 12/1929 | Colvin | 15—250.19 |
| 1,973,071 | 9/1934 | Hilton | 15—250.19 |
| 2,355,860 | 8/1944 | Hansen | 15—250.3 |
| 2,678,460 | 5/1954 | Oishei | 15—250.34 |
| 2,771,784 | 11/1956 | Diebel | 91—347 |
| 2,800,675 | 7/1957 | Oishei et al. | 15—250.13 |
| 2,802,232 | 8/1957 | Oishei et al. | 15—250.12 |
| 2,811,735 | 11/1957 | Oishei et al. | 15—250.13 |

IRVING BUNEVICH, *Primary Examiner.*

CHARLES A. WILMUTH, *Examiner.*

ROBERT W. JENKINS, *Assistant Examiner.*